US011770406B2

United States Patent
Li et al.

(10) Patent No.: US 11,770,406 B2
(45) Date of Patent: Sep. 26, 2023

(54) SYSTEMS AND METHODS FOR MITIGATING CYBERATTACKS

(71) Applicant: HEWLETT PACKARD ENTERPRISE DEVELOPMENT LP, Houston, TX (US)

(72) Inventors: Yuanjie Li, Milpitas, CA (US); Kyu-Han Kim, Milpitas, CA (US); Qianru Li, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 243 days.

(21) Appl. No.: 17/183,195

(22) Filed: Feb. 23, 2021

(65) Prior Publication Data
US 2022/0272120 A1 Aug. 25, 2022

(51) Int. Cl.
*H04L 9/40* (2022.01)
(52) U.S. Cl.
CPC ...... *H04L 63/1458* (2013.01); *H04L 63/0227* (2013.01)
(58) Field of Classification Search
CPC ............. H04L 63/1458; H04L 63/0227; H04L 63/1466
See application file for complete search history.

(56) References Cited

U.S. PATENT DOCUMENTS

| | | | |
|---|---|---|---|
| 7,120,931 B1 * | 10/2006 | Cheriton | H04L 63/0227 726/13 |
| 8,059,551 B2 | 11/2011 | Milliken | |
| 10,812,523 B2 | 10/2020 | Latapie et al. | |
| 2003/0014665 A1 * | 1/2003 | Anderson | H04L 63/1458 726/4 |
| 2005/0021999 A1 * | 1/2005 | Touitou | H04L 69/16 726/11 |
| 2006/0212572 A1 * | 9/2006 | Afek | H04L 63/1491 709/225 |
| 2008/0295175 A1 * | 11/2008 | Ansari | H04L 63/1416 726/23 |
| 2011/0185418 A1 * | 7/2011 | Boteler | G06F 21/552 726/22 |
| 2014/0317741 A1 * | 10/2014 | Be'ery | H04L 63/16 726/23 |

OTHER PUBLICATIONS

Akamai, "DDoS Protection", available online at <https://www.akamai.com/us/en/resources/ddos-protection.jsp>, 2021, 4 pages.

(Continued)

*Primary Examiner* — Huan V Doan
(74) *Attorney, Agent, or Firm* — Sheppard Mullin Richter & Hampton LLP (57) ABSTRACT

Systems and methods for mitigating cyberattacks are described herein. A computing system can detect illegitimate network traffic associated with a cyberattack in network traffic. The computing system can determine an amplification factor of the cyberattack based in part on a probability distribution of the illegitimate network traffic. The computing system can determine a filter to demotivate a generation of the illegitimate network traffic. The determined filter can reduce the amplification factor of the cyberattack. The computing system can implement the determined filter to block the illegitimate network traffic.

17 Claims, 5 Drawing Sheets

(56) References Cited

OTHER PUBLICATIONS

AWS, "AWS Shield", available online at <https://web.archive.org/web/20200413094955/https://aws.amazon.com/shield/>, Apr. 13, 2020, 11 pages.
Cloudflare, "Comprehensive DDoS Protection", available online at <https://www.cloudflare.com/ddos/>, 2021, 10 pages.
Goodfellow et al., "Generative Adversarial Nets", Jun. 10, 2014, 9 pages.
Khalidi, Yousef, "Microsoft partners with the industry to unlock new 5G scenarios with Azure Edge Zones", Microsoft Azura, available online at <https://azure.microsoft.com/en-us/blog/microsoft-partners-with-the-industry-to-unlock-new-5g-scenarios-with-azure-edge-zones/>, Mar. 31, 2020, 9 pages.
Microsoft Azure, "Azure DDoS Protection", available online at <https://web.archive.org/web/20190326014345/https://azure.microsoft.com/en-us/services/ddos-protection/>, Mar. 26, 2019, 8 pages.
Nadav et al., "2019 Global DDoS Threat Landscape Report", available online at <https://www.imperva.com/blog/2019-global-ddos-threat-landscape-report/>, Feb. 4, 2020, 10 pages.
Open vSwitch, "Production Quality, Multilayer Open Virtual Switch", Linux Foundation, available online at <https://www.openvswitch.org/>, 2016, 2 pages.
Charlier, J. et al., "SynGAN: Towards Generating Synthetic Network Attacks using GANs," Aug. 2019, 8 pgs., https://arxiv.org/pdf/1908.09899.pdf.
Das, S., "Distributed Denial of Service Intrusion Detection Through Machine Learning Approach," Dec. 2019, 11 pgs., website accessed Nov. 24, 2020, https://www.researchgate.net/publication/343546983_DISTRIBUTED_DENIAL_OF_SERVICE_INTRUSION_DETECTION_THROUGH_MACHINE_LEARNING_APPROACH.
Kumar, B. et al., "Using Game Theory to Model DoS Attack and Defence," Sadhana, Nov. 30, 2019, 12 pgs., https://www.ias.ac.in/article/fulltext/sadh/044/12/0245, Indian Academy of Sciences.
Miano, S. et al., "Introducing SmartNICs in Server-Based Data Plane Processing: The DDoS Mitigation Use Case," IEEE Access, Aug. 6, 2019, 11 pgs., https://ieeexplore.ieee.org/document/8789414, IEEE.

* cited by examiner

Computing Component 400

Hardware Processor(s) 402

Machine-Readable Storage Media 404

Detect illegitimate network traffic associated with a cyberattack in network traffic
406

Determine an amplification factor of the cyberattack based on a probability distribution of the illegitimate network traffic
408

Determine a filter to demotivate a generation of the illegitimate network traffic, wherein the filter reduces the amplification factor of the cyberattack
410

Implement the determined filter to block the illegitimate network traffic
412

SYSTEMS AND METHODS FOR MITIGATING CYBERATTACKS

BACKGROUND

Edge computing systems are widely used in cloud computing environments to provide low latency cloud-based applications to client devices. Because of stringent latency demands of edge computing systems, edge computing systems are more vulnerable to distributed denial-of-service attacks than other networked computing systems.

BRIEF DESCRIPTION OF THE DRAWINGS

The present disclosure, in accordance with one or more various embodiments, is described in detail with reference to the following figures. The figures are provided for purposes of illustration only and merely depict typical or exemplary embodiments.

The figures are not exhaustive and do not limit the present disclosure to the precise form disclosed.

DETAILED DESCRIPTION

In recent years, more and more applications have migrated from being hosted in local computing environments to being hosted in cloud computing environments. With numerous emergent applications, such as real-time video analytics, autonomous applications, online gaming, virtual or augmented reality applications, moving to cloud computing environments, cloud computing systems running these applications in the cloud computing environments may not have adequate response times to run these applications effectively (e.g., glitches, slow load times, etc.). For example, a cloud computing system may host an online game. For smooth gameplay, the online game may have a low latency requirement. In this example, response times of the cloud computing system may not be fast or quick enough to meet the low latency requirement to run the online game smoothly. As such, edge computing systems have been developed to improve response times of cloud computing systems.

In general, edge computing systems are extensions of a cloud computing system and can improve response times of the cloud computing system by being physically closer to client devices accessing the cloud computing system. Because edge computing systems have overtaken cloud computing systems in providing low-latency services to client devices, edge computing systems have become primary targets for distributed denial-of-service (DDoS) attacks. Moreover, because applications hosted by edge computing systems have stringent latency demands, these applications may be more vulnerable to DDoS attacks. For example, a DDoS attack on an edge computing system may cause response times of the edge computing system to slow, thereby crippling a cloud-based application running on the edge computing system.

In some approaches, dedicated DDoS mitigation infrastructures (e.g., specialized network devices that detect and defend against DDoS attacks) can be deployed to a cloud computing network to monitor ingress network traffic to edge computing systems of the cloud computing network. The dedicated DDoS mitigation infrastructures can scrub or examine the network traffic to identify illegitimate network traffic (e.g., DDoS traffic) from legitimate network traffic. Upon detection of illegitimate network traffic, the dedicated DDoS mitigation infrastructures can apply filters to remove or drop the illegitimate network traffic from the cloud computing network, thereby preventing the illegitimate network traffic from reaching and overwhelming the edge computing systems. However, these approaches have many drawbacks. For example, the dedicated DDoS mitigation infrastructures can only absorb a limited volumes of illegitimate network traffic and do not scale with a size of a DDoS attack. As another example, the dedicated DDoS mitigation infrastructures lack an ability to defend against higher layer (e.g., application layer) DDoS attacks. Furthermore, costs associated with deploying such dedicated DDoS mitigation infrastructures can be expensive.

Examples described herein addresses the technical problems described above. In various embodiments, there can be a cloud computing network comprising a gateway and one or more edge computing systems. The cloud computing network can be coupled to a public network, such as the internet, through the gateway. In some embodiments, the gateway can be configured to manage network traffic directed to the one or more edge computing systems from the public network. The gateway can be configured to determine illegitimate network traffic from legitimate network traffic when the cloud computing network is undergoing a cyberattack (e.g., a DDoS attack) launched by an attacker. Upon detection of the illegitimate network traffic, the gateway can evaluate the network traffic to determine a probability distribution of the illegitimate network traffic and a probability distribution of the legitimate network traffic. Based on these probability distributions, the gateway can select and deploy a filter that thwarts the cyberattack while minimizing impacts to low-latency services provided by the one or more edge computing systems. The filter is selected such that it reduces an amplification factor of the cyberattack to demotivate or disincentivize the attacker from continued cyberattack, while maximizing network servicing ability of the one or more edge computing systems. In this way, the cloud computing network can maintain services to client devices while trying to fend off the cyberattack. In various embodiments, the filter that is selected and deployed is a hardware-based filter and the filter can be determined based on a generative adversarial net (GAN) framework.

Figure 1:
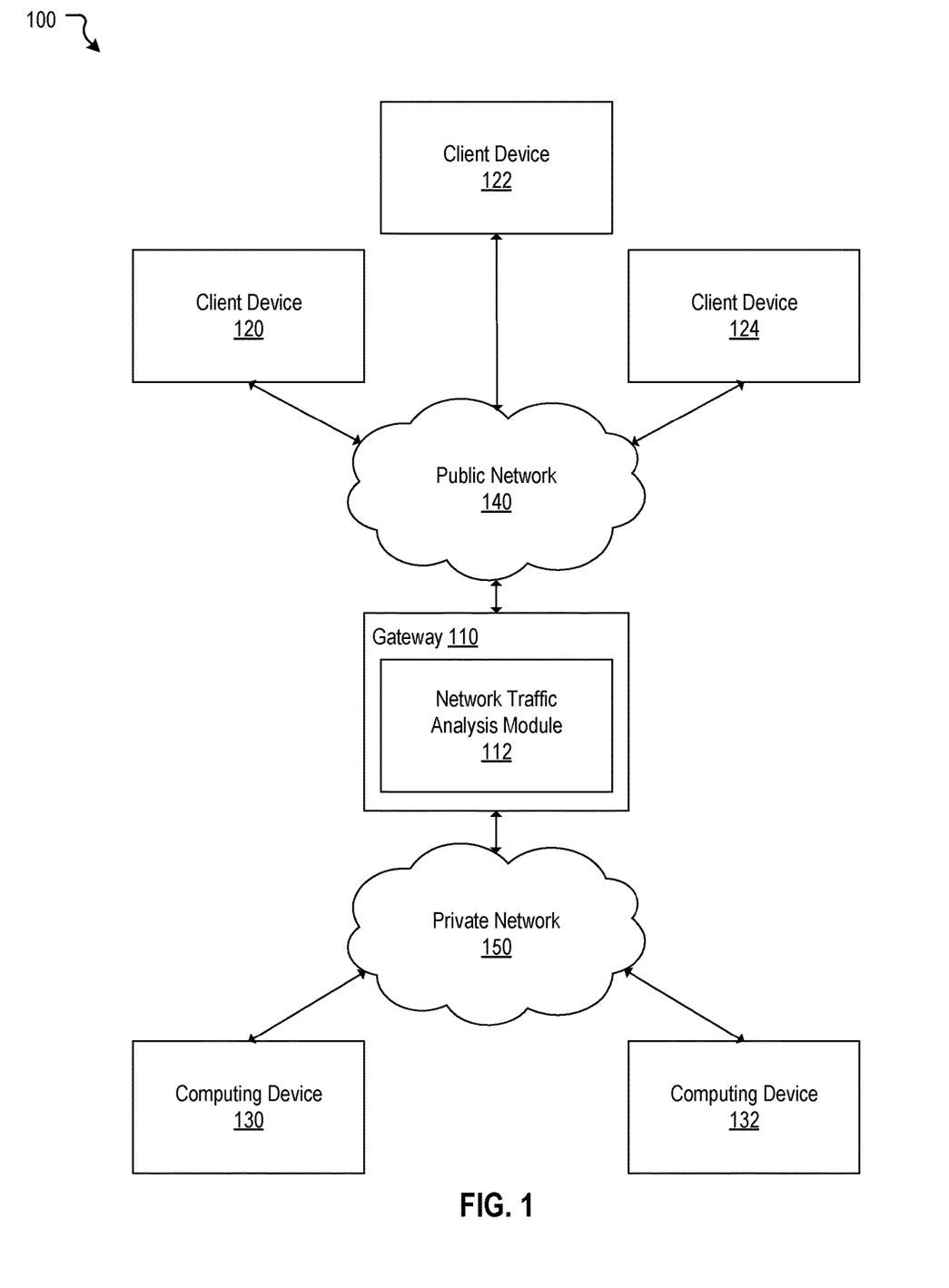
FIG. 1 illustrates an example network environment, in accordance with various embodiments of the present disclosure.

FIG. 1 illustrates an example network environment 100, in accordance with various embodiments of the present disclosure. As shown in FIG. 1, in some embodiments, the network environment 100 can include a gateway 110 communicatively coupled to client devices 120-124 over a public network 140, such as the internet. The gateway can be communicatively coupled to the public network 140 at one end and a private network 150, such as a cloud computing network, at the other end. In general, the gateway 110 can be a network device that enables a network passage between the public network 140 and the private network 150. For example, the gateway 110 can allow network traffic (e.g., internet traffic) to pass from the public network 140 to the private network 150. As another example, the gateway 110 can allow network traffic generated within the private network 150 to pass to the public network 140. In some embodiments, the network environment 100 can further include computing devices 130, 132. The computing devices 130, 132 can be communicatively coupled to the gateway 110 over the private network 150. The computing devices 130, 132 can receive requests from the public network 140 through the private network 150 and generate responses (e.g., cloud services) responsive to the requests. These responses can pass from the private network 150 back to the public network 140 through the gateway 110. In some embodiments, the computing devices 130, 132 can be edge computing systems of a cloud computing system, such as edge servers. In general, edge servers tend to be located closer to the client devices 120-124 than other servers of the cloud computing system. Applications accessible by the client devices 120-124 are generally being hosted in the edge server so response times (e.g., latencies) associated with the applications are minimized. In some embodiments, the computing devices 130, 132 can be a part or portion of the edge computing systems. In various embodiments, the computing devices 130, 132 can host low-latency cloud-based applications that are accessible to the client devices 120-124.

In some embodiments, the gateway 110 can include a network traffic analysis module 112. The network traffic analysis module 112 can be configured (or programmed) to perform various network traffic monitoring functions. For example, the network traffic analysis module 112 can decode header information of network traffic from the public network 140 and determine whether destination internet protocol (IP) addresses specified in the header information are addressed to the computing devices 130, 132. If so, network traffic analysis module 112 can instruct the gateway 110 to allow the network traffic to pass from the public network 140 to the private network 150, and eventually to the computing devices 130, 132. In some embodiments, the network traffic analysis module 112 can be configured to determine legitimacy of network traffic addressed to the computing devices 130, 132. For example, the network traffic analysis module 112 can be configured to identify illegitimate network traffic addressed to the computing devices 130, 132 from legitimate network traffic addressed to the computing devices 130, 132. Illegitimate network traffic are network traffic intended to overwhelm the computing devices 130, 132 (e.g., to slow response times of the computing devices 130, 132). Legitimate network traffic are normal network traffic addressed to the computing devices 130, 132. The network traffic analysis module 112 can determine whether a cyberattack is in progress and, in response, implement remedial measures to protect the computing devices 130, 132 and/or the private network 150 from the cyberattack. The network traffic analysis module 112 will be discussed in further detail with reference to FIG. 2 herein.

In some embodiments, some or all of the client devices 120-124 may be infected with malware from an attacker trying to launch a cyberattack against the computing devices 130, 132 and/or the private network 150. In such embodiments, the client devices 120-124 are said to have been "hijacked" by the attacker and the attacker can remotely configure the client devices 120-124, though the malware, to launch a coordinated cyberattack, such as a distributed denial-of-service (DDoS) attack, against the computing devices 130, 132 and/or the private network 150. During a coordinated DDoS attack, the hijacked client devices (or zombie client devices) can generate, in unison, illegitimate network traffic directed to the computing devices 130, 132. The illegitimate network traffic may be disguised in such a way that the network traffic analysis module 112 may not identify the illegitimate network traffic as being illegitimate and may allow the illegitimate network traffic to pass through. For example, a gateway associated with a cloud computing system may not detect an application layer DDoS attack launched from hijacked client devices. In such cases, the computing devices 130, 132 may be overwhelmed by the illegitimate network traffic and cause response times of the computing devices 130, 132 to be negatively impacted. As such, the various embodiments disclosed herein provide a solution that mitigates cyberattacks launched by attackers.

Figure 2:
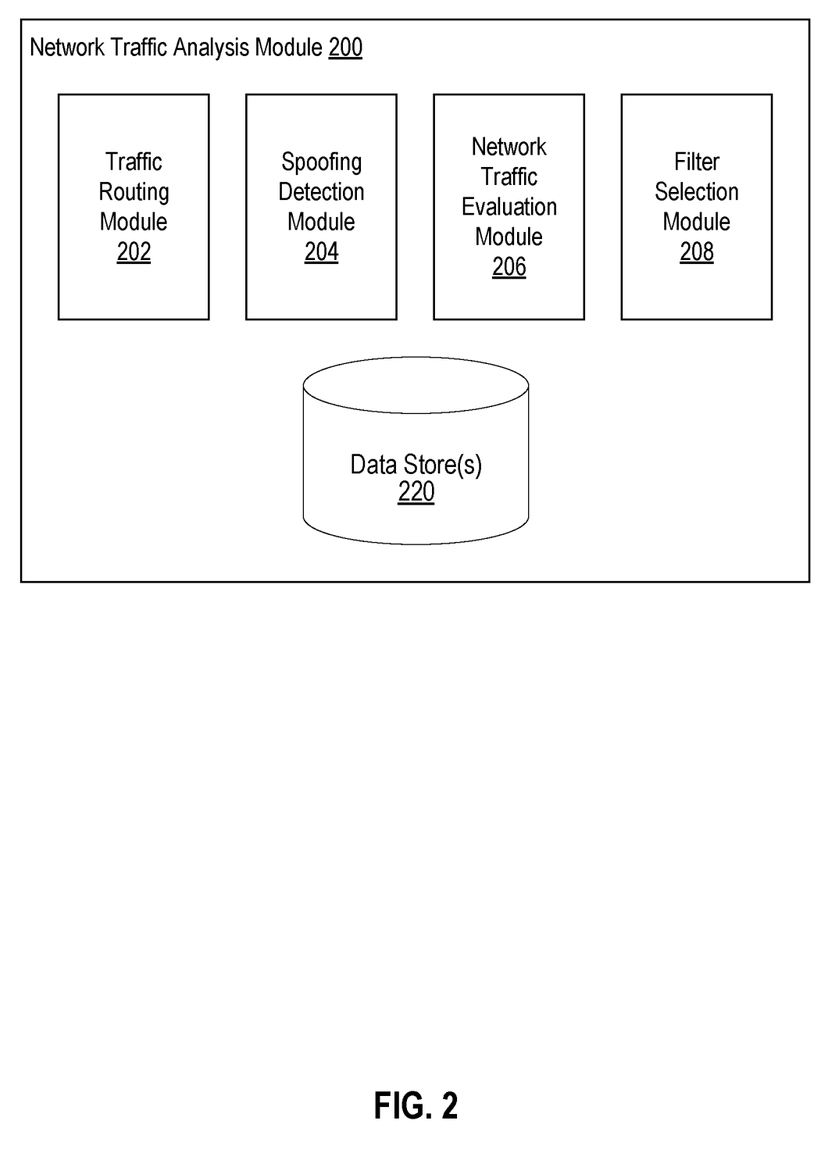
FIG. 2 illustrates an example network traffic analysis module, in accordance with various embodiments of the present disclosure.

FIG. 2 illustrates an example network traffic analysis module 200, in accordance with various embodiments of the present disclosure. In some embodiments, the network traffic analysis module 112 of FIG. 1 can be implemented as the network traffic analysis module 200. As discussed with reference to FIG. 1 above, in various embodiments, the network traffic analysis module 200 can monitor network traffic (e.g., internet traffic) from the internet. If the network traffic is directed to computing devices of a private network in which a gateway including the network traffic analysis module 200 is a node, the gateway can allow the network traffic to pass through. As shown in FIG. 2, In some embodiments, the network traffic analysis module 200 can comprise a traffic routing module 202, a spoofing detection module 204, a network traffic evaluation module 206, and a filter selection module 208. Each of the traffic routing module 202, the spoofing detection module 204, the network traffic evaluation module 206, and the filter selection module 208 will be discussed in further detail herein.

In some embodiments, the traffic routing module 202 can be configured to route network traffic directed to computing devices of a private network from a public network, such as the internet, through a gateway of the private network. In various embodiments, the computing devices can be edge computing systems and the private network can be a cloud computing network. The traffic routing module 202 can determine whether the network traffic is directed to the computing devices based on header information of the network traffic. For example, the traffic routing module 202 can decode and analyze destination internet protocol (IP) addresses specified in the header information. if the destination IP addresses match IP addresses of the computing devices, the traffic routing module 202 can allow the network traffic to pass through the gateway and into the private network. Similarly, in some embodiments, the traffic routing module 202 can route network traffic generated by the computing devices of the private network to other computing devices over the public network. For example, in response to receiving a request from a client device over the public network, the computing devices may generate network traffic directed to the client device. In this example, the traffic routing module 202 can analyze header information of the network traffic and allow the network traffic to pass through the gateway and into the public network. In some embodiments, the traffic routing module 202 can be configured to track one or more key performance indicators relating to cyberattacks. Non-limiting examples of a key performance indicator include a total number of security incidents, mean time to detect a cyberattack or cyberbreach, mean time to contain a cyberattack or cyberbreach. The one or more key performance indicators can be used to determine effectiveness of the gateway in detecting a cyberattack and/or a filter in fending off the cyberattack.

In some embodiments, the spoofing detection module 204 can be configured to retrace origins of the network traffic that arrive at the gateway and are addressed (directed) to the computing devices of the private network. Retracing of network traffic to its origins can help in determining legitimacy of the network traffic. For example, if IP packets (i.e., the network traffic) are traced to non-existence client devices, these IP packets are likely to be "spoofed" and malicious. The spoofing detection module 204 can receive network traffic passing through the gateway. The spoofing detection module 204 can swap source IP addresses and destination IP addresses specified in header information of the network traffic to emulate responses from client devices that generated the network traffic. For example, in response to receiving an IP packet addressed to the computing devices of the private network, the spoofing detection module 204 can generate a network ping request (i.e., another IP packet) that swaps an origin IP and a destination IP address specified in a header of the IP packet. This network ping request is then transmitted back to the public network. If no response is received by the spoofing detection module 204 within a threshold time period, the IP packet is deemed spoofed and the spoofing detection module 204 drops or removes that IP packet from the private network. As such, the spoofing detection module 204 can provide a first line of defense against lower layer DDoS attacks.

In some embodiments, the network traffic evaluation module 206 can be configured to evaluate legitimacy of the network traffic directed to the computing devices of the private network. For example, the network traffic evaluation module 206 can determine whether the computing devices of the private network are under a cyberattack, such as a DDoS attack. The network traffic evaluation module 206 can determine an amplification factor of the cyberattack based in part on a probability distribution of illegitimate network traffic (i.e., spoofed IP packets) in the network traffic directed to the computing devices of the private network. In some embodiments, the amplification factor of the cyberattack can be determined as follows:

$$\eta = \Sigma_{k=1}^{N} c_k \hat{p}_g(k) D_G(k)$$

where $\eta$ is an amplification factor of a cyberattack, $c_k$ is a classical DDoS bandwidth amplification factor for network traffic addressed to various open systems interconnection (OSI) layers of network protocol (e.g., "k"), $\hat{p}_g(k)$ is a probability distribution of illegitimate network traffic addressed various OSI layers of network protocol generated by an attacker launching the cyberattack, and $D_G(k)$ is a filter to be selected by the filter selection module 208 to mitigate the illegitimate network traffic addressed to the various OSI layers of network protocol of the cyberattack. In some examples, various filters (e.g., $D_G(k)$) with which to mitigate a cyberattack can be inserted into the equation above until a satisfactory amplification factor (e.g., $\eta \le 1$) is achieved. In other examples, a filter may be pre-inserted into the equation above and changed until a satisfactory amplification factor is achieved. In some embodiments, the classical DDoS bandwidth amplification factor for network traffic can be determined as follows:

$$c_k = \frac{payload_{reflector\ to\ victim}}{payload_{attacker\ to\ victim}}$$

where $payload_{reflector\ to\ victim}$ is a portion of the illegitimate network traffic generated by hijacked client devices and $payload_{attacker\ to\ victim}$ is a portion of the illegitimate network traffic generated directly by the attacker as determined by the network traffic evaluation module 206. In some implementations, the portion of the illegitimate network traffic generated by hijacked client devices and the portion of the illegitimate network traffic generated directly by the attacker can be determined based on internet protocol (IP) address or, in some cases, media access control (MAC) addresses. Many variations are possible.

In general, an amplification factor of a cyberattack can be thought of as being a motivation for an attacker to launch a cyberattack against a computing system. A high amplification factor, or $\eta > 1$, generally favors or motivates the attacker to launch a cyberattack against the computing system as the attacker can use little bandwidth to launch the cyberattack to exhaust bandwidth of the computing system. Whereas, a low amplification factor, or $\eta \le 1$, generally disfavors or demotivates the attacker from launching the cyberattack against the computing system because bandwidth cost to the attacker to launch the cyberattack becomes higher. Therefore, the goal is for the network traffic evaluation module 206 to determine a filter to be selected by the filter selection module 208 such that deployment of the filter disincentivizes the attacker from continued cyberattack.

In some embodiments, the network traffic evaluation module 206 can be configured to determine a filter to be selected to thwart a motivation of an attacker (i.e., an amplification factor of a cyberattack) from launching a cyberattack against the computing devices of the private network. The network traffic evaluation module 206 can determine the filter to be selected by maximizing network service ability (e.g., response times of the computing devices) upon detection of illegitimate network traffic. This method of determining a filter to be selected to thwart a cyberattack can be based on a generative adversary net (GAN) framework. A GAN is a type of machine learning technique in which a generator and a discriminator are adversaries. Goal of the generator is to generate illegitimate data that can slip through detection of the discriminator while goal of the discriminator is to detect the illegitimate data generated by the generator. By using a framework with which a GAN is trained, a filter can be determined that can best thwart a cyberattack. In general, a cyberattack launched from an attacker to a computing system (i.e., victim) can be modeled as a GAN, where the attacker is a generator of the GAN and a filter with which to mitigate or thwart the cyberattack to the computing system is a discriminator of the GAN. The purpose of the generator is to generate illegitimate data (e.g., illegitimate IP packets or illegitimate network traffic) that can pass through detection of the discriminator (e.g., the filter). While the purpose of the discriminator is to select a filter that prevents illegitimate data from entering the computing system. In training of the GAN, the discriminator is trained to maximize allowance of legitimate data while selecting a filter to prevent illegitimate data from entering the computing system. Adapting to such a GAN framework, in some embodiments, the network traffic evaluation module 206 can determine the filter to be selected as follows:

$$\max_{D|G} V(G|D) = E_{k \in p_{data}} \log(D_G(k)) + E_{k \in G} \log(1 - D_G(k))$$

where $D_G(k)$ is a filter to be selected, $E_{k \in p_{data}}$ and $E_{k \in G}$ are parameters relating to illegitimate network traffic, and max V(G|D) is an optimization of the filter to be selected in view of illegitimate network traffic (e.g., "G" or generator) and legitimate network traffic (e.g., "D" or discriminator). In such embodiments, the network traffic evaluation module 206 can determine the filter to be selected based on maximizing allowance of the legitimate network traffic in view of the illegitimate network traffic. In some embodiments, the filter to be selected can be simply approximated as follows:

$$D_G^*(k) = \frac{\hat{p}_k}{\hat{p}_k + \hat{p}_g(k)}$$

where $D^*_G(k)$ is a filter to be selected to thwart a motivation to launch a cyberattack, $\hat{p}_k$ is a probability of legitimate network traffic under the cyberattack determined by the network traffic evaluation module 206 upon detection of the cyberattack, and $\hat{p}_g(k)$ is a probability of illegitimate network traffic under the cyberattack determined by the network traffic evaluation module 206 upon detection of the cyberattack. A filter to be selected determined, under such embodiments, will significantly reduce an amplification factor of a cyberattack—by a factor of 75% for single DDoS attacks and by a factor of 50% for mixed DDoS attacks. As such, the network traffic evaluation module 206 can, upon detection of illegitimate network traffic of a cyberattack, determine an optimal filter that maximizes network service ability of the computing devices of the private network, while reducing an amplification factor of the cyberattack to demotivate or disincentivize an attacker from continued cyberattack.

In some embodiments, the filter selection module 208 can select a filter to deploy to thwart a motivation of an attacker from launching a cyberattack against the computing devices of the private network. The filter selection module 208 can select the filter to deploy based on instructions provided by the network traffic evaluation module 206, as discussed above. In some embodiments, to minimize latency costs associated with deploying such filters, the filter selection module 208 can select hardware-based filters with which to thwart cyberattacks. In one implementation, the filter selection module 208 can offload a selected filter to thwart the cyberattack by leveraging hardware offloading features in one or more high-performance network interface cards (NICs) associated with the gateway. Leveraging the hardware offloading features of the one or more high-performance NICs to deploy filters to guard against the cyberattack can minimize impact to response times of the computing devices.

In some embodiments, as shown in FIG. 2, the network traffic analysis module 200 can further include at least one data store 220. The at least one data store 220 can be configured to store various data associated with the traffic routing module 202, the spoofing detection module 204, the network traffic evaluation module 206, and the filter selection module 208. For example, the at least one data store 220 can store various probabilities and probability distributions computed or determined by the network traffic evaluation module 205. In some embodiments, the at least one data store 220 can include a data structure, such as a data buffer. In such embodiments, the data structure may be used by the spoofing detection module 204 to swap origin IP addresses and destination IP address specified in header information of network traffic to generate network ping requests. Many variations are possible.

Figure 3:
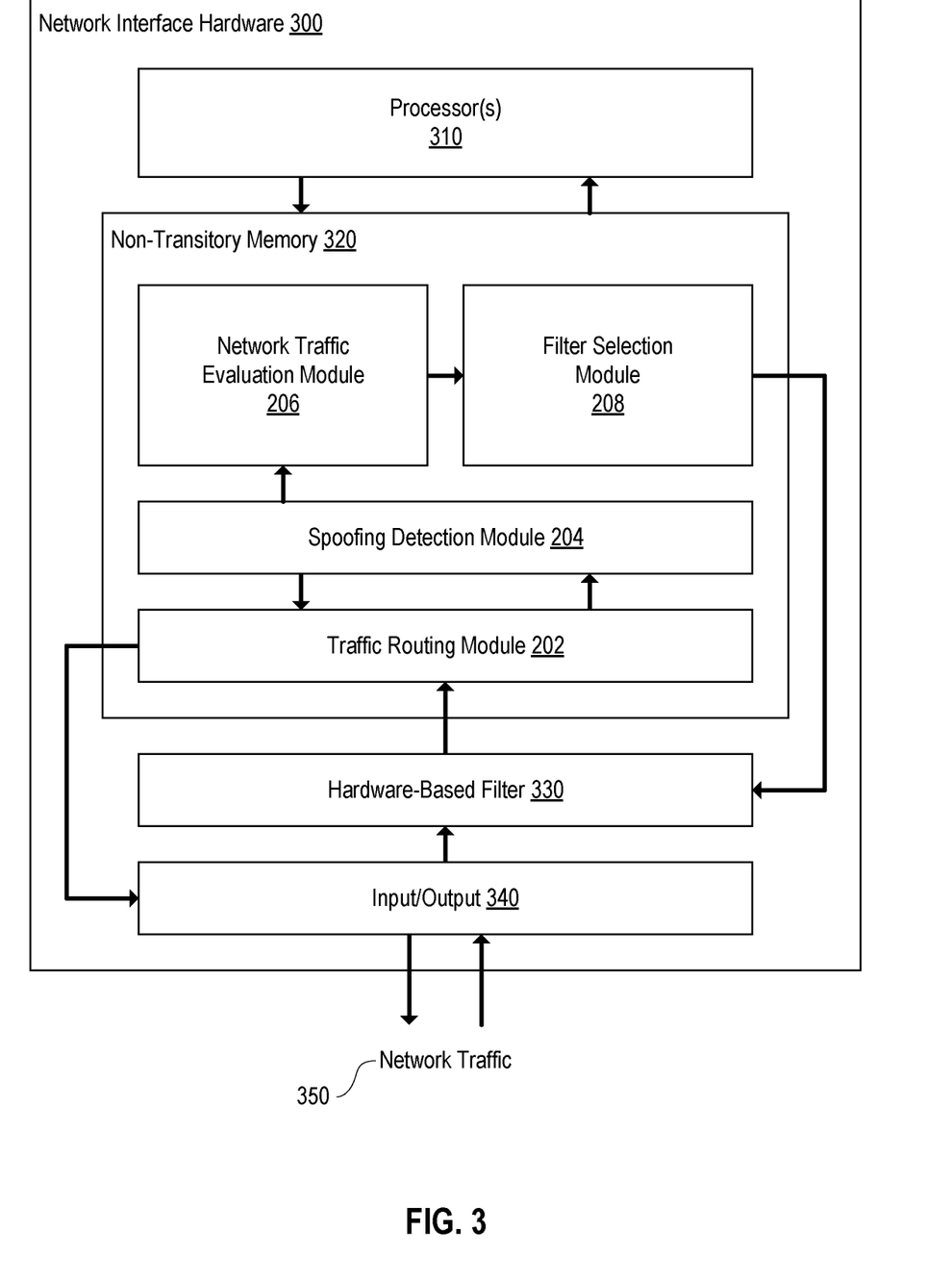
FIG. 3 illustrates an example network interface hardware, in accordance with various embodiments of the present disclosure.

FIG. 3 illustrates an example network interface hardware 300, in accordance with various embodiments of the present disclosure. In some embodiments, the network interface hardware 300 can be integrated into a gateway (e.g., the gateway 110 of FIG. 1) of a private network, such as a cloud computing network. In some embodiments, the network interface hardware 300 can be an exemplary hardware on which various functionalities of the network traffic analysis module 200 of FIG. 2 can be implemented. As shown in FIG. 3, in some embodiments, the network interface hardware 300 can include one or more processors 310, a non-transitory memory 320, a hardware-based filter 330, and an input/output 340. In some embodiments, the non-transitory memory 320 can include the traffic routing module 202, the spoofing detection module 204, the network traffic evaluation module 206, and the filter selection module 208 of FIG. 2. The non-transitory memory 320 can store instructions (e.g., source code) and/or data associated with the traffic routing module 202, the spoofing detection module 204, the network traffic evaluation module 206, and the filter selection module 208. In some embodiments, the one or more processors 310 can be configured to execute the instructions and/or the data stored in the non-transitory memory 320 to execute various functionalities of the network traffic analysis module 200 discussed with reference to FIG. 2.

In some embodiments, as shown in FIG. 3, network traffic 350 from a public network, such as the internet, can be received by the input/output 340 of the network interface hardware 300. In one implementation, the input/output 340 can be one or more network ports, such as ethernet ports. In another implementation, the input/output 340 can be one or more wireless network ports, such as wireless antennas. The network traffic 350 then passes through the hardware-based filter 330 of the network interface hardware 300. If the one or more processors 310 selects and deploys a filter to block illegitimate network traffic in the network traffic 350, the filter is implemented in the hardware-based filter 330. If no such filter is deployed, the network traffic 350 passes to the traffic routing module 202. As discussed, the traffic routing module 202 can determine destination of the network traffic 350 based on header information. If destination IP addresses specified in the header information match IP addresses of computing systems associated with the network interface hardware 300, the traffic routing module 202 passes the network traffic 350 to the spoofing detection module 204. If the destination IP addresses do not match the IP addresses of the computing systems, the traffic routing module 202 drops the network traffic 350. As discussed, the spoofing detection module 204 can retrace the network traffic 350 to its origins to determine whether the network traffic 350 includes illegitimate network traffic (e.g., spoofed IP packets). The spoofing detection module 204 can generate network ping requests and pass the network ping requests to the traffic routing module 202, which is then passed to the input/output 340 for transmission. If the spoofing detection module 204 determines that there are spoofed IP packets in the network traffic 350, the network traffic evaluation module 206 then computes probability distributions of illegitimate network traffic and legitimate network traffic and determines a filter with which to mitigate a cyberattack currently undergoing. The filter is determined to minimize an amplification factor of the cyberattack to demotivate or disincentivize an attacker launching the cyberattack from continued cyberattack while maximizing allowance of legitimate network traffic. The filter selection module 208 then implements the determined filter in the hardware-based filter 330 of the network interface hardware 300.

Figure 4:
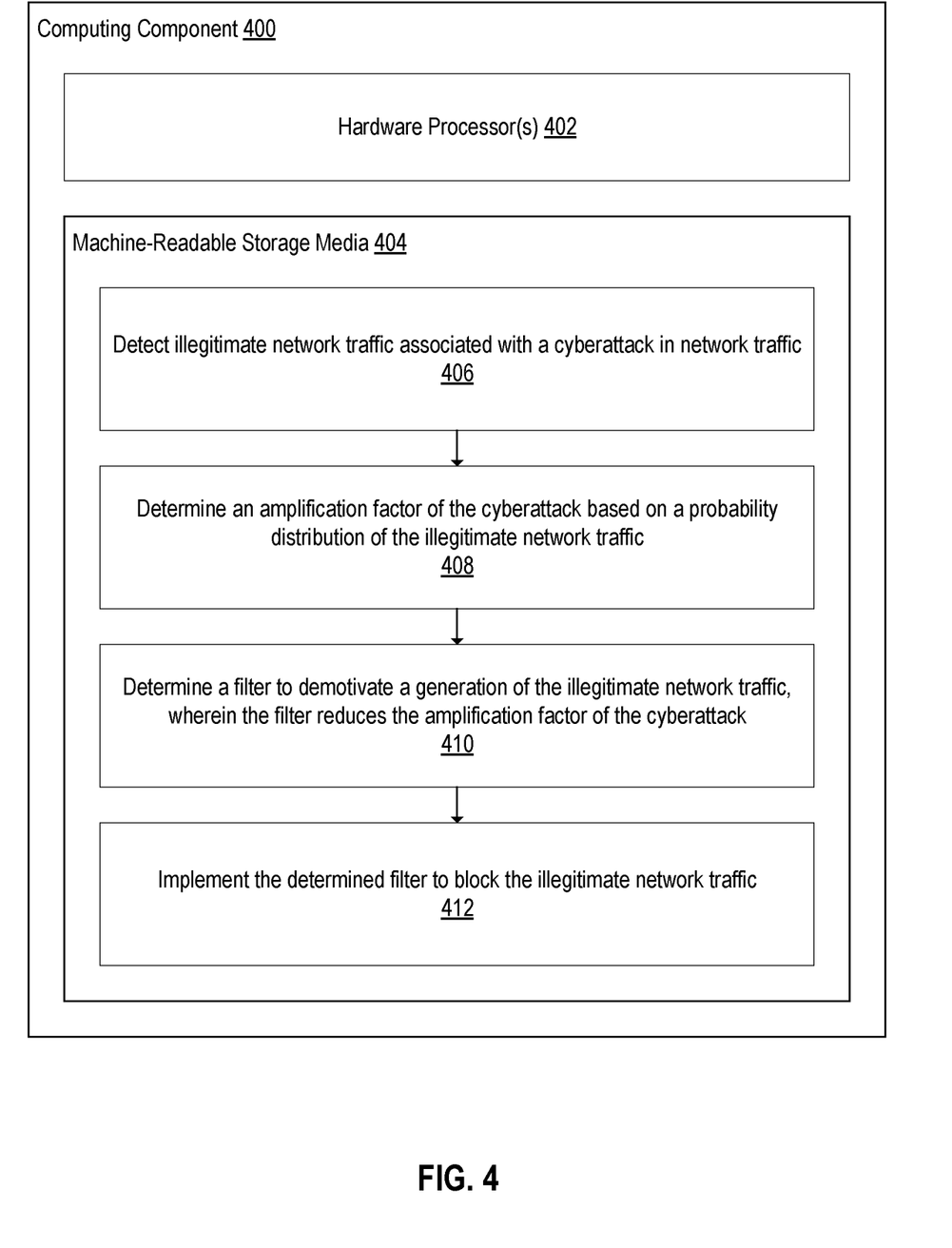
FIG. 4 illustrates a computing component that includes one or more hardware processors and machine-readable storage media storing a set of machine-readable/machine-executable instructions that, when executed, cause the hardware processor(s) to perform an illustrative method for mitigating cyberattacks, in accordance with various embodiments of the present disclosure.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method for mitigating cyberattacks, in accordance with various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the hardware processor(s) 402 may execute machine-readable/machine-executable instructions stored in the machine-readable storage media 404 to detect illegitimate network traffic associated with a cyberattack in network traffic. In some embodiments, the cyberattack can be a coordinated distributed denial-of-service (DDoS) attack.

At block 408, the hardware processor(s) 402 may execute machine-readable/machine-executable instructions stored in the machine-readable storage media 404 to determine an amplification factor of the cyberattack based on a probability distribution of the illegitimate network traffic. In some embodiments, the amplification factor of the cyberattack can be further determined based on a bandwidth amplification factor in one or more network protocols and a filter to be selected.

At block 410, the hardware processor(s) 402 may execute machine-readable/machine-executable instructions stored in the machine-readable storage media 404 to determine a filter to demotivate a generation of the illegitimate network traffic. The filter can reduce the amplification factor of the cyberattack. In some embodiments, the filter to demotivate the generation of the illegitimate network traffic can be determined based on a probability distribution of legitimate network traffic and the probability distribution of the illegitimate network traffic. In some embodiments, the filter to demotivate the generation of the illegitimate network traffic can be based on a generative adversary net framework that blocks the illegitimate network traffic while maximizing the legitimate network traffic to minimize impacts to response times of a computing system associated with the computing component 400.

At block 412, the hardware processor(s) 402 may execute machine-readable/machine-executable instructions stored in the machine-readable storage media 404 to implement the determined filter to block the illegitimate network traffic. In some embodiments, the selected filter to block the illegitimate network traffic can be implemented through hardware offloading features of at least one network interface hardware associated with the computing system.

Figure 5:
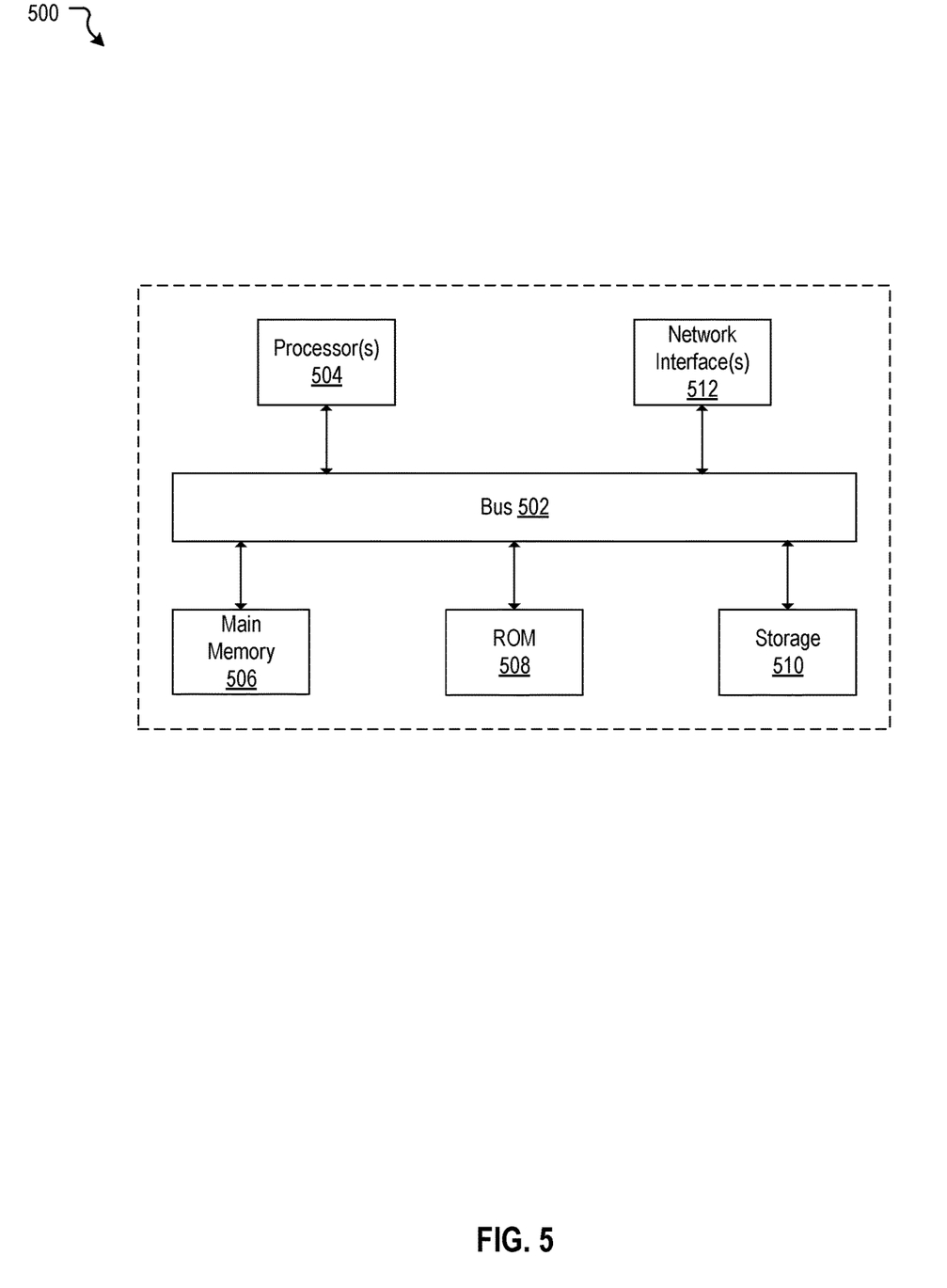
FIG. 5 illustrates a block diagram of an example computer system in which various embodiments of the present disclosure may be implemented.

FIG. 5 illustrates a block diagram of an example computer system 500 with which various embodiments of the present disclosure may be implemented. The computer system 500 can include a bus 502 or other communication mechanism for communicating information, one or more hardware processors 504 coupled with the bus 502 for processing information. The hardware processor(s) 504 may be, for example, one or more general purpose microprocessors. The computer system 500 may be an embodiment of an access point or similar device.

The computer system 500 can also include a main memory 506, such as a random access memory (RAM), cache and/or other dynamic storage devices, coupled to the bus 502 for storing information and instructions to be executed by the hardware processor(s) 504. The main memory 506 may also be used for storing temporary variables or other intermediate information during execution of instructions by the hardware processor(s) 504. Such instructions, when stored in a storage media accessible to the hardware processor(s) 504, render the computer system 500 into a special-purpose machine that can be customized to perform the operations specified in the instructions.

The computer system 500 can further include a read only memory (ROM) 508 or other static storage device coupled to the bus 502 for storing static information and instructions for the hardware processor(s) 504. A storage device 510, such as a magnetic disk, optical disk, or USB thumb drive (Flash drive), etc., can be provided and coupled to the bus 502 for storing information and instructions.

Computer system 500 can further include at least one network interface 512, such as a network interface controller module (NIC), network adapter, or the like, or a combination thereof, coupled to the bus 502 for connecting the computer system 500 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 500, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques or technology described herein using customized hard-wired logic, one or more ASICs or FPGAs, firmware and/or program logic which in combination with the computer system 500 that causes or programs the computer system 500 to be a special-purpose machine. According to one or more embodiments, the techniques described herein are performed by the computer system 500 in response to the hardware processor(s) 504 executing one or more sequences of one or more instructions contained in the main memory 506. Such instructions may be read into the main memory 506 from another storage medium, such as the storage device 510. Execution of the sequences of instructions contained in the main memory 506 can cause the hardware processor(s) 504 to perform process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 510. The volatile media can include dynamic memory, such as the main memory 506. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 502. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method, the method comprising:
   detecting, by a computing system, illegitimate network traffic associated with a cyberattack in network traffic;
   determining, by the computing system, an amplification factor of the cyberattack based on a probability distribution of the illegitimate network traffic, wherein the amplification factor of the cyberattack correlates with a ratio between an amount of the illegitimate network traffic generated by hijacked client devices and an amount of the illegitimate network traffic generated directly by an attacker;
   determining, by the computing system, a filter to demotivate a generation of the illegitimate network traffic, wherein the filter reduces the amplification factor of the cyberattack; and
   implementing, by the computing system, the determined filter to block the illegitimate network traffic.

2. The computer-implemented method of claim 1, wherein the amplification factor of the cyberattack is determined based on a bandwidth amplification factor in one or more network protocols and a filter to be selected.

3. The computer-implemented method of claim 1, wherein the filter to demotivate the generation of the illegitimate network traffic is determined based on a probability distribution of legitimate network traffic and the probability distribution of the illegitimate network traffic.

4. The computer-implemented method of claim 1, wherein the filter to demotivate the generation of the illegitimate network traffic is based on a generative adversary net framework.

5. The computer-implemented method of claim 4, wherein the filter blocks the illegitimate network traffic while maximizing legitimate network traffic to minimize impacts to response times of the computing system.

6. The computer-implemented method of claim 1, wherein the implemented filter to block the illegitimate network traffic is implemented through hardware offloading features of at least one network interface hardware associated with the computing system.

7. The computer-implemented method of claim 1, further comprising:
   determining, by the computing system, whether a portion of internet protocol (IP) packets of the network traffic is spoofed IP packets.

8. The computer-implemented method of claim 7, wherein determining whether the portion of the IP packets of the network traffic is the spoofed IP packets comprises:
   swapping origin IP addresses with destination IP addresses associated with the portion of the IP packets, wherein the origin IP addresses and the destination IP addresses are specified in headers associated with the portion of the IP packets; and
   generating network ping requests based on the swapped IP addresses.

9. The computer-implemented method of claim 8, wherein determining whether the portion of the IP packets of the network traffic is the spoofed IP packets further comprises:
   transmitting the network ping requests to a public network.

10. The computer-implemented method of claim 1, wherein the cyberattack is a coordinated distributed denial-of-service attack.

11. A computing system comprising:
    at least one processor; and
    a memory storing instructions that, when executed by the at least one processor, cause the computing system to perform a method, the method comprising:
       detecting illegitimate network traffic associated with a cyberattack in network traffic;
       determining an amplification factor of the cyberattack based on a probability distribution of the illegitimate network traffic, wherein the amplification factor of the cyberattack correlates with a ratio between an amount of the illegitimate network traffic generated by hijacked client devices and an amount of the illegitimate network traffic generated directly by an attacker;

determining a filter to demotivate a generation of the illegitimate network traffic, wherein the filter reduces the amplification factor of the cyberattack; and implementing the determined filter to block the illegitimate network traffic.

12. The computing system of claim 11, wherein the filter to demotivate the generation of the illegitimate network traffic is determined based on a probability distribution of legitimate network traffic and the probability distribution of the illegitimate network traffic.

13. The computing system of claim 11, wherein the filter to demotivate the generation of the illegitimate network traffic is based on a generative adversary net framework.

14. The computing system of claim 13, wherein the filter blocks the illegitimate network traffic while maximizing legitimate network traffic to minimize impacts to response times of the computing system.

15. A non-transitory storage medium of a computing system storing instructions that, when executed by at least one processor of the computing system, cause the computing system to perform a method, the method comprising:

detecting illegitimate network traffic associated with a cyberattack in network traffic;

determining an amplification factor of the cyberattack based on a probability distribution of the illegitimate network traffic, wherein the amplification factor of the cyberattack correlates with a ratio between an amount of the illegitimate network traffic generated by hijacked client devices and an amount of the illegitimate network traffic generated directly by an attacker;

determining a filter to demotivate a generation of the illegitimate network traffic, wherein the filter reduces the amplification factor of the cyberattack; and implementing the determined filter to block the illegitimate network traffic.

16. The non-transitory storage medium of claim 15, wherein the filter to demotivate the generation of the illegitimate network traffic is determined based on a probability distribution of legitimate network traffic and the probability distribution of the illegitimate network traffic.

17. The non-transitory storage medium of claim 15, wherein the filter to demotivate the generation of the illegitimate network traffic is based on a generative adversary net framework.

* * * * *